United States Patent [19]

Scott

[11] 4,116,496
[45] Sep. 26, 1978

[54] INTERNAL SNOW DEFLECTOR FOR SNOWMOBILE TRACK

[75] Inventor: Gary Scott, Idaho Falls, Id.

[73] Assignee: Bombardier Limited, Valcourt, Canada

[21] Appl. No.: 504,261

[22] Filed: Sep. 9, 1974

[51] Int. Cl.² .............................................. B62D 55/20
[52] U.S. Cl. ........................................ 305/12; 305/13; 180/5 R
[58] Field of Search ................... 305/11, 12, 13, 35 R, 305/7, 8, 53; 180/5 R

[56] References Cited

U.S. PATENT DOCUMENTS

| | | |
|---|---|---|
| 2,900,210 | 8/1959 | Parsons .................................. 305/12 |
| 3,082,044 | 3/1963 | Klemm ................................... 305/12 |
| 3,355,225 | 11/1967 | McDowell .............................. 305/53 |
| 3,472,563 | 10/1969 | Irgens .................................... 305/13 |

Primary Examiner—Philip Goodman
Attorney, Agent, or Firm—Smart & Biggar

[57] ABSTRACT

In snowmobiles operating under wet snow conditions, compaction of the snow between the upper and lower runs of the snowmobile track may cause undue friction eventually resulting in stalling of the snowmobile. This invention provides a series of projecting ribs on the internal surface of the snowmobile track, the ribs being constructed and arranged to sweep the region between the suspension elements of the snowmobile thereby inhibiting the build up of snow.

15 Claims, 8 Drawing Figures

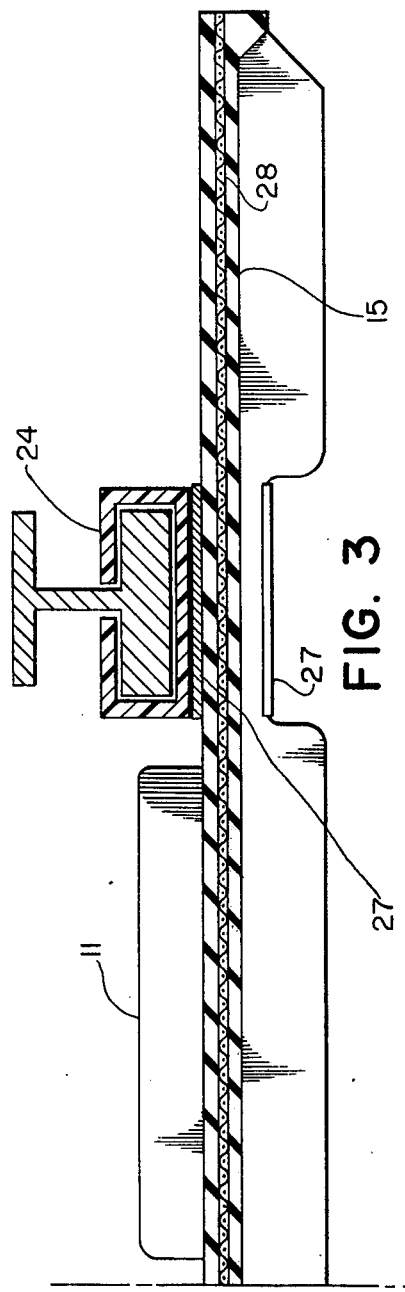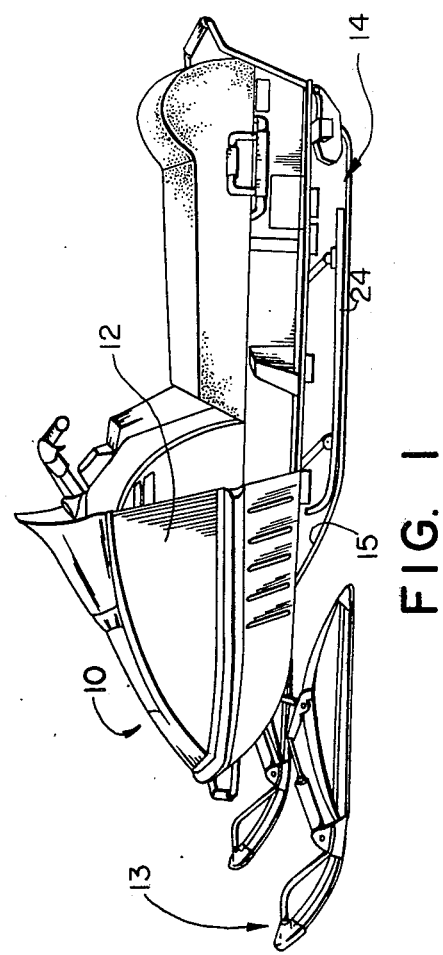

INTERNAL SNOW DEFLECTOR FOR SNOWMOBILE TRACK

FIELD OF THE INVENTION

This invention relates to ribs on a snowmobile track used for preventing snow from compacting between the upper and lower runs of the snowmobile track under operating conditions of the snowmobile, and particularly when operating under wet snow conditions.

When operating a snowmobile under wet snow conditions, an accumulation of snow between the upper and lower runs of a snowmobile track will occur due in part because there is no way to remove the snow entering the track laterally of the suspension system of the snowmobile, and also because the vertical movement of the suspension system itself will compact the snow entering this area. Consequently, as the amount of snow compacted increases, it eventually reaches a depth where suspension movement itself becomes restricted and the vehicle bogs down due to friction between the track and the compacted snow, and also due to the increased weight.

SUMMARY OF THE INVENTION

Accordingly, the invention disclosed and claimed in this application is a snowmobile track comprising a longitudinally-flexible generally flat belt of one-piece construction formed in an endless loop having an external ground-engaging surface and an internal surface, said internal surface defining longitudinally extending laterally spaced areas for engagement by suspension elements when the track is mounted in a snowmobile, and further comprising a comtinuous series of projecting ribs positioned on said internal surface between said laterally spaced areas throughout the length of said belt, said ribs being constructed and arranged such that in operation they will sweep the region between the suspension elements of the snowmobile and inhibit compaction of snow in this region.

The ribs may be molded integrally with the track or detachably mounted thereto for ease of replacement. It will of course be understood that when detachably mounted ribs are employed, a suitable fastening means would of course be utilized for attaching such ribs to the track. They also may extend perpendicular or obliquely to the length of the snowmobile track and individual ribs may cover in whole or in part the transverse distance between the laterally spaced areas. As the ribs are elongated, they may conveniently be referred to as "bar means".

BRIEF DESCRIPTION OF THE DRAWINGS

The invention will now be described, by way of example only, with reference to the accompanying drawings, in which:

FIG. 1 is a side view of a snowmobile;
FIG. 3 is a sectional view taken along line III—III of FIG. 2.

DESCRIPTION OF THE PREFERRED EMBODIMENT

Figure 2:
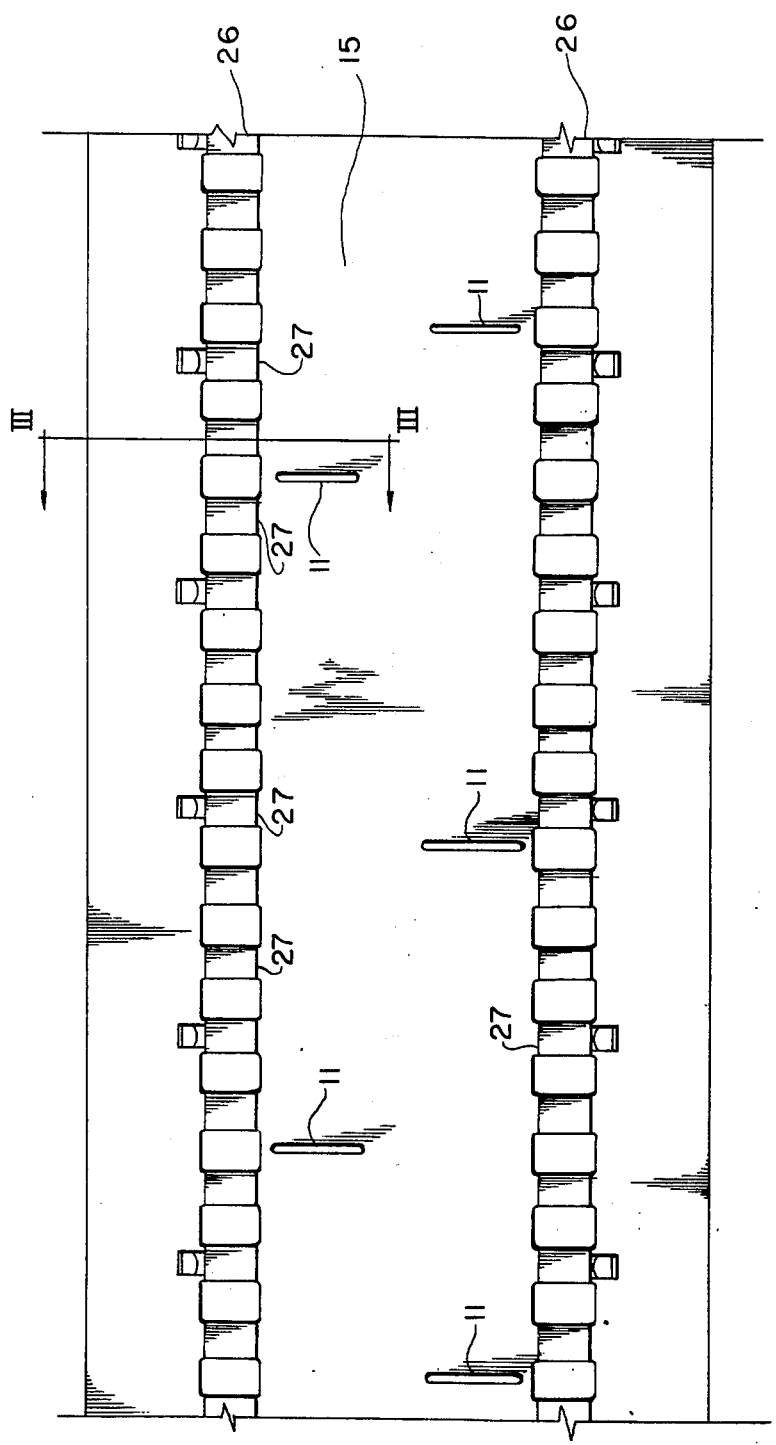
FIG. 2 is a plan view of the lower inside run of the snowmobile track.

In FIG. 1, a snowmobile shown generally at 10 has a body 12, a forwardly mounted pair of steerable skis 13, and a suspension system shown generally at 14. The suspension system includes a slide frame consisting of a pair of longitudinal slide rails 24 (only one of which is shown) which contact the lower inner run of the snowmobile track 15 to provide support and shock absorption for the snowmobile.

The track 15 (FIGS. 2 and 3) is made in the usual manner from molded natural or synthetic rubber, with a reinforcing integral layer 28 made from nylon or some other like material. Reinforcing rods (not shown) are located transverse to the track length at regular longitudinal intervals and extend substantially across the entire track width to provide transverse reinforcement.

A pair of drive sprockets (not shown) is located at the forward end of the snowmobile; these sprockets have teeth which project through two longitudinal rows of openings 26 (FIG. 2) in the track 15 as the track passes over the drive sprockets whereby the openings constitute a drive engaging means. At the opposite end of the track is a pair of idler pulleys (not shown) which are adjustable to provide the correct tension and which guide the track at its rearward end.

C-shaped metal cleats 27 are located at the front and rear edges of the openings 26 in the track 15 to provide a reinforcement area designated to withstand the force caused by the teeth of the drive sprocket when entering the track openings. In addition, the cleats provide two laterally spaced apart longitudinal areas extending around the inside periphery of the track over which the slide rails 24 of the suspension system operate (FIG. 3), the cleats 27 providing an interface between the slide rail 24 and the track 15 to protect the track from the wear due to the slide and to increase the life of the slide by reducing the friction therebetween.

Between the laterally spaced areas defined by the openings 26 in the track and the attached reinforcing cleats 27, a series of projecting transverse ribs 11 are positioned alternately on opposite sides of the center line of the track throughout the track length. The ribs are integrally molded with the belt, extend transverse to its length, and are of a narrow, elongate form. It has been found that optimum longitudinal spacing of the ribs is approximately 12 to 15 inches and that the optimum projection distance from the inside surface of the track is approximately ⅜ to ⅝ inch.

Under wet snow operating conditions, snow enters the suspension system 14 in that area of the upper and lower runs of the track between the area traversed by the longitudinal slide rails of the slide frame. The snow, being of wet or moist consistency, has a tendency to accumulate in this area, particularly when the suspension system moves vertically a distance large enough to begin compaction of the trapped snow. Eventually, the snow builds up and comes into contact with the upper and lower inside runs of the track. The projecting ribs 11 act to gouge out and remove portions of this compacted snow thereby allowing free passage of the track.

Figure 4A:
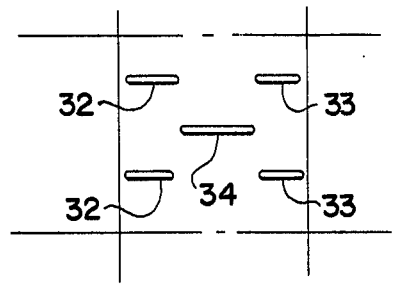
FIGS. 4A–4E show alternative configurations the rib pattern may take.

Alternative embodiments of the rib configuration will be evident and a sampling is shown in FIGS. 4A–4E. In FIG. 4A, a double pattern of two transverse ribs 32, 33 covers that part of the lateral area of the track in the sweep area (i.e., between the slide rails of the slide frame). Between the two sets of transverse ribs is an additional set of ribs 34 which sweep the remaining part of the lateral area of the track. The combined effect of the rib pattern of FIG. 4A is to sweep the entire area between the slide rails thereby preventing snow accumulation throughout that area.

Figure 4B:
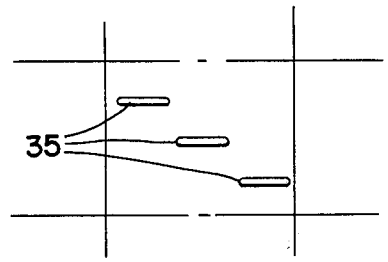

In FIG. 4B, the rib pattern comprises three transversely spaced ribs 35, each of the ribs being of essentially the same lateral extent as the other. The ribs, in combination, act again to sweep the entire area between the slides.

Figure 4C:
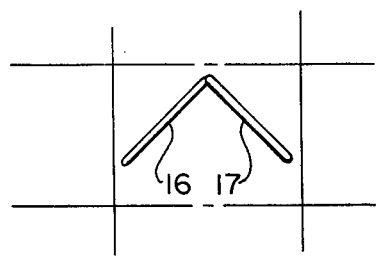
Figure 4D:
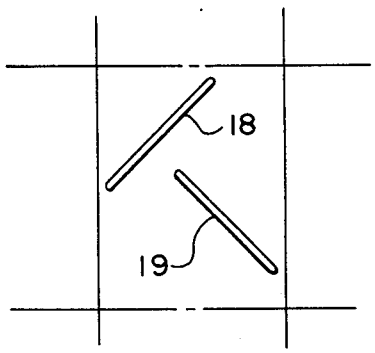

In FIGS. 4C and 4D, an angular rib pattern is shown (i.e., the pattern comprises ribs 16, 17 in FIG. 4C and 18, 19 in FIG. 4D which are obliquely angled to the longitudinal axis of the snowmobile track). An additional advantage accrues with this configuration besides the previously discussed gouging action. With obliquely positioned ribs, the gouging action serves to provide a sidewise force to the snow being displaced, which acts to throw it to the outside of the track. Without the obliquely extending ribs (i.e., with the transverse configuration as shown in FIGS. 2, 4A and 4B), the accumulation of snow in the sweep area remains effectively static during the gouging action. With the angular ribs however, the removal of snow is positively obtained with the consequence that the ribs on the track will operate more efficiently.

Figure 4E:
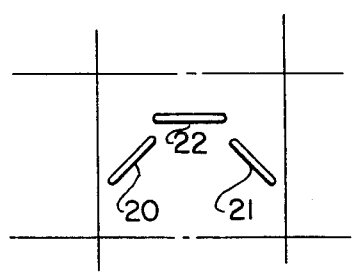

FIG. 4E shows a combination configuration utilizing transverse ribs and ribs obliquely angled to the longitudinal axis of the track. Again, the combination of the three ribs 20, 21, and 22 together sweep the accumulation area between the slides, the two outer obliquely angled ribs 20, 21 acting to displace sidewise gouged snow and the transverse rib 22 serving merely to move the compacted snow in a longitudinal direction.

In addition to the embodiment shown where the track is driven by a pair of laterally spaced drive sprockets, it will also be understood that the invention may be applied to snowmobile tracks utilising a single drive sprocket engaging a centrally located single row of sprocket holes in the track, whereby said single row of holes constitutes a drive engaging means, as well as to those snowmobiles using tracks which are driven internally through projecting lugs or the like engaged by the drive sprocket whereby said lugs or the like would constitute the drive engaging means. Further, it is not necessary to sweep the entire distance between the slide rails as only a partial sweeping may be sufficient for preventing the snow accumulation, although the sweep distance required will generally be the major portion of the lateral distance between the slide rails.

While several preferred embodiments have been shown it will be obvious that further modifications may be made within the scope of the invention which should be limited only by the appended claims.

What I claim as my invention is:

1. A snowmobile track comprising: a longitudinally-flexible generally flat belt of one-piece construction formed in an endless loop having an external ground-engaging surface and an internal surface, said internal surface defining longitudinally extending laterally spaced areas for engagement by suspension elements when the track is mounted in a snowmobile, said internal surface further including longitudinally extending drive engaging means for cooperating with a snowmobile drive means, said internal surface further comprising a continuous series of projecting ribs separate from said drive means positioned on said internal surface between said laterally spaced areas throughout the length of said belt, said ribs having a total lateral extent which corresponds to at least the major part of the lateral spacing between said laterally spaced areas and being constructed and arranged such that in operation they will sweep the region between the suspension elements of the snowmobile and inhibit compaction of snow in this region.

2. A snowmobile track according to claim 1 wherein said ribs have a total lateral extent which corresponds to the lateral spacing between said laterally spaced areas.

3. A snowmobile track according to claim 1 wherein said series of projecting ribs comprises ribs positioned substantially perpendicular to the length of said snowmobile track.

4. A snowmobile track according to claim 1 wherein said series of projecting ribs comprises ribs obliquely angled to the length of said snowmobile track.

5. A snowmobile track according to claim 1 wherein said series of projecting ribs comprises a combination of ribs positioned substantially perpendicular to the length of said track and ribs obliquely angled thereto.

6. A snowmobile track according to claim 1 wherein successive ribs are longitudinally separated by a distance of from 12 to 15 inches and each of said ribs projects from said internal surface by a height of from $\frac{3}{8}$ to $\frac{5}{8}$ inch.

7. A snowmobile track according to claim 1, wherein said ribs are molded integrally with said track.

8. A snowmobile track according to claim 1, wherein said ribs are detachably mounted on said belt.

9. A snowmobile track comprising a longitudinally-flexible generally flat belt of one-piece construction formed in an endless loop having an external ground-engaging surface and an internal surface, said internal surface defining longitudinally extending laterally spaced areas for engaging suspension elements of a snowmobile, said internal surface further including longitudinally extending drive engaging means for cooperating with a snowmobile drive means, said internal surface further comprising a continuous series of projecting ribs positioned on said internal surface throughout the length of said belt, said ribs having a total lateral extent which covers at least the major portion of the lateral spacing between said areas, said ribs further projecting from said internal surface by a height of from $\frac{3}{8}$ to $\frac{5}{8}$ inch and adjacent ones of said ribs being separated by a longitudinal distance of from 12 to 15 inches.

10. A snowmobile comprising:
a prime mover;
an endless belt track having inside and outside surfaces and upper and lower legs and being connected at said inside surface by drive means to and rotated by the prime mover, the outside surface powering the snowmobile by engagement with the snow;
snow plow means secured to the inside surface of the belt track and projecting into the enclosure between said upper and lower legs, the snow plow means being carried during rotation by the belt track and extending angularly across the belt a distance less than the full width of the belt so as to both (a) avoid interference with the drive means and (b) engage, loosen and plow snow from within the enclosure between said upper and lower legs and the ends of the endless belt track.

11. A snowmobile according to claim 10 wherein said plow means comprise bar means projecting away from the inside surface of the belt into the enclosure, said bar means being diagonally oriented across but spanning a distance less than the edge-to-edge distance of the inside belt track surface.

12. A snowmobile according to claim 11 wherein the bar means comprise a plurality of bars disposed at spaced locations along said inside belt track surface.

13. A snowmobile according to claim 10 wherein the snow plow means are secured to the inside surface of the belt track by fastener means.

14. A snowmobile comprising:

a prime mover;

an endless belt track having upper and lower legs and being connected by drive means to and rotated by the prime mover, said belt track having inside and outside surfaces, the outside surface powering the snowmobile by engagement with the snow;

snow plow means secured to the inside surface of the belt track and carried during rotation by the belt track so as to avoid interference with the drive means and to engage, loosen and plow snow from within the enclosure between said upper and lower legs and the ends of the endless belt track, said plow means comprising bar means projecting away from the inside surface of the belt into the enclosure, said bar means being diagonally oriented across but spanning a distance less than the edge-to-edge distance of the inside belt track surface, the bar means comprising at least two sets of bars, each set being oppositely diagonally disposed so as to respectively plow snow from within the belt enclosure toward opposite side edges of the belt track.

15. A snowmobile comprising:

a prime mover;

an endless belt track having upper and lower legs and being connected by drive means to and rotated by the prime mover, said belt track having inside and outside surfaces, the outside surface powering the snowmobile by engagement with the snow;

snow plow means secured to the inside surface of the belt track and carried during rotation by the belt track so as to avoid interference with the drive means and to engage, loosen and plow snow from within the enclosure between said upper and lower legs and the ends of the endless belt track, said plow means comprise bar means projecting away from the inside surface of the belt into the enclosure, said bar means being diagonally oriented across but spanning a distance less than the edge-to-edge distance of the inside belt track surface, said bar means comprise at least two spaced protrusions running parallel to each other.

* * * * *